Oct. 28, 1941. P. E. CASSELL ET AL 2,261,051
CHANGE SPEED TRANSMISSION
Filed Oct. 2, 1939  5 Sheets-Sheet 1

INVENTORS.
Perry E. Cassell
Robert R. Meeker
BY Lancaster, Allwine Rommel
ATTORNEYS.

Oct. 28, 1941.  P. E. CASSELL ET AL  2,261,051
CHANGE SPEED TRANSMISSION
Filed Oct. 2, 1939   5 Sheets-Sheet 2
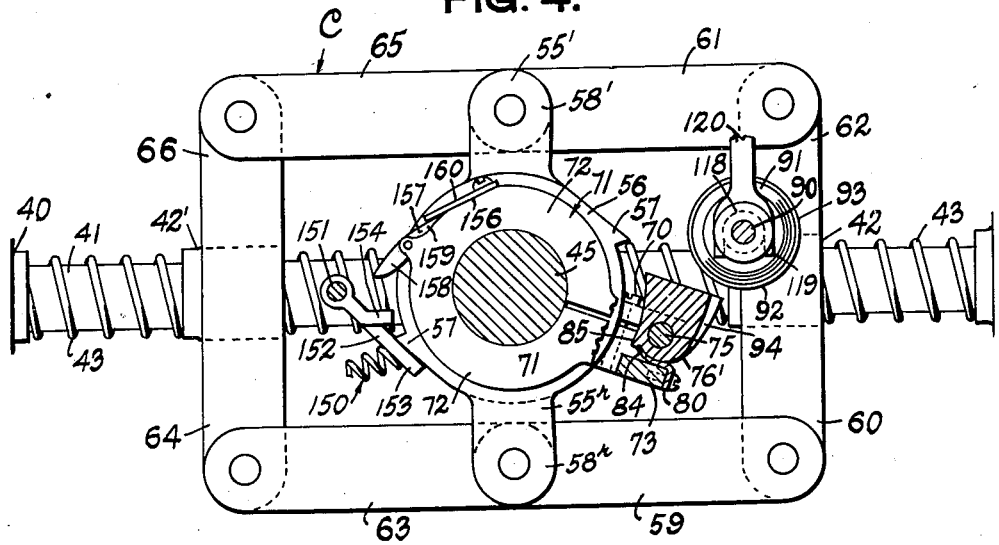
INVENTORS
Perry E. Cassell
Robert R. Meeker
BY Lancaster, Allwine and Rommel
ATTORNEYS.

Oct. 28, 1941.  P. E. CASSELL ET AL  2,261,051
CHANGE SPEED TRANSMISSION
Filed Oct. 2, 1939  5 Sheets—Sheet 3
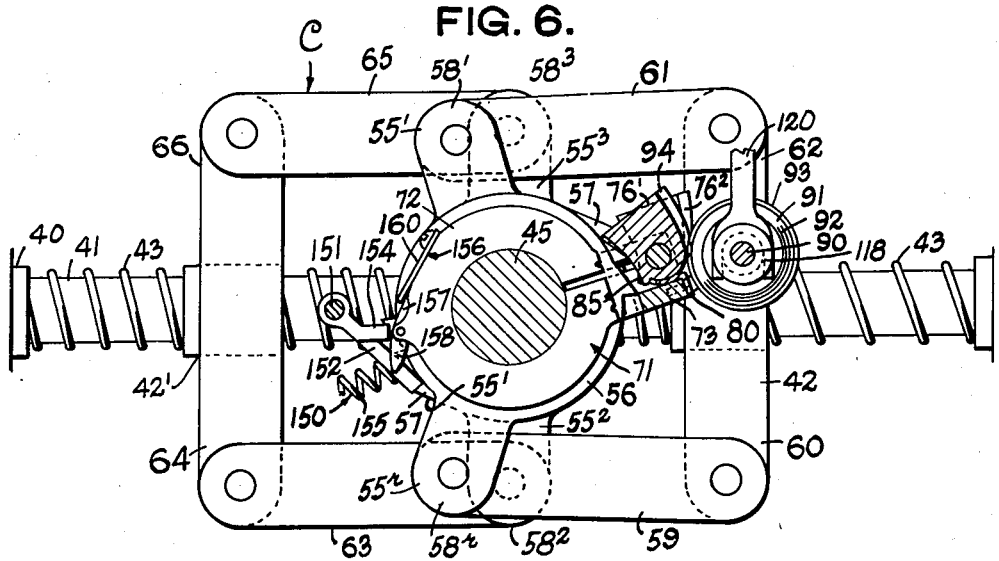
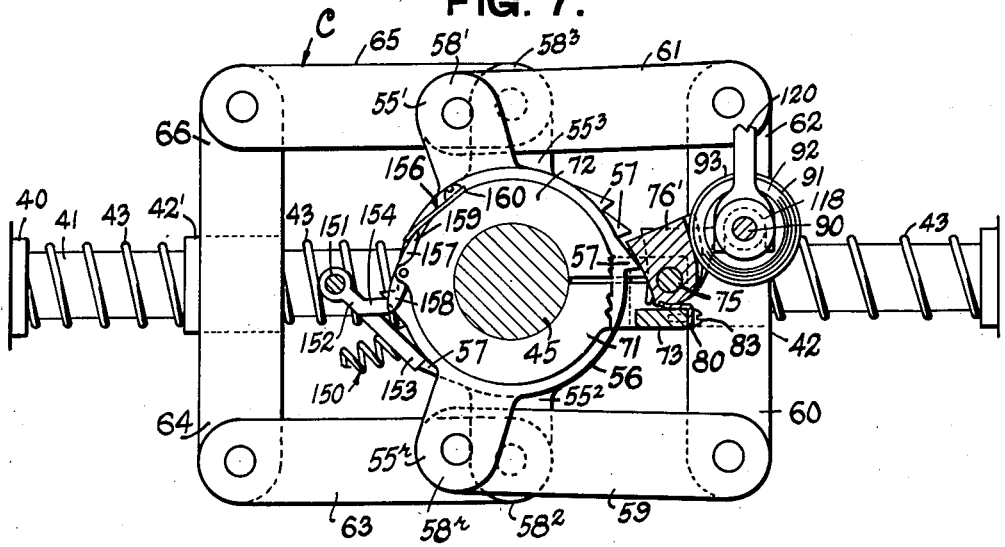
INVENTORS.
Perry E. Cassell
Robert R. Meeker
BY Lancaster, Allwine Rommel
ATTORNEYS.

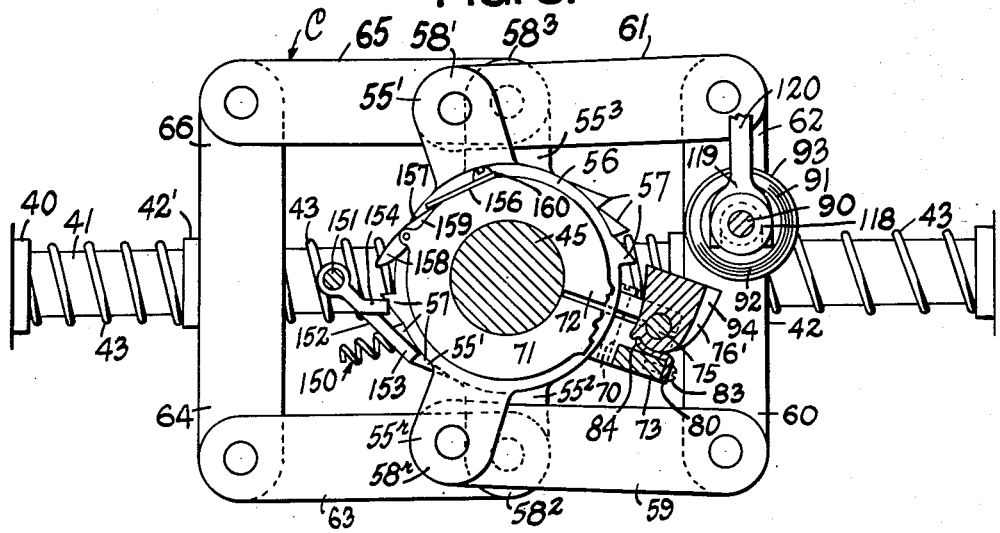

Oct. 28, 1941.  P. E. CASSELL ET AL  2,261,051
CHANGE SPEED TRANSMISSION
Filed Oct. 2, 1939  5 Sheets-Sheet 5

INVENTORS.
Perry E. Cassell
Robert R. Meeker
BY Lancaster, Allwine and Rommel
ATTORNEYS.

Patented Oct. 28, 1941

2,261,051

UNITED STATES PATENT OFFICE 2,261,051

CHANGE SPEED TRANSMISSION

Perry E. Cassell and Robert R. Meeker, McKean, Pa.

Application October 2, 1939, Serial No. 297,584

8 Claims. (Cl. 192—3.5)

The present invention relates to improvements in automotive vehicles and to control means for change speed power transmissions.

An object of the invention is to provide manual and semi-automatic control means for a change speed power transmission.

Another object of the invention resides in the provision of manual and resilient semi-automatic control means for a change speed transmission wherein the manual control means may be operated without disconnection of the semi-automatic control means.

A further object of the invention is to provide manual and semi-automatic control means for a change speed transmission wherein the manual control means functions as an indicator of the operating position of the semi-automatic control means.

Yet another object is the provision of semi-automatic control means for the conventional change speed power transmission of an automotive vehicle and wherein the control means is provided with a speed influenced selector acting within a plurality of speed ranges and operable in each speed range to dispose the control means in readiness to correlate the change speed transmission to the vehicle speed.

A still further object is to provide means for selecting one of a plurality of adjacent change speed members without affecting contiguous change speed members.

The invention also aims to provide semi-automatic control means applicable to standard forms of change speed transmissions of the character including a main shaft, a counter shaft and a pair of spaced shifting collars slidable on the main shaft.

The invention further contemplates the provision of control means for the change speed transmission of an automotive vehicle and wherein the control means correlates the transmission to various forward speeds of the vehicle and is so constructed as to preclude unintentional reversal of the transmission during forward travel of the vehicle.

Other objects and advantages of the invention will be apparent from the following detailed description, taken in connection with the accompanying drawings, forming a part of this specification and in which drawings:

Figure 4 is a fragmentary detail view of the control means showing the relative position of parts when in neutral.

Figure 5 is a similar view showing a relative position of parts when the control means is in a partially advanced position and about to shift the transmission from neutral into first speed.

Figure 6 is a similar view showing the relative position of parts when the control means is in an advanced position with the transmission shifted into first speed.

Figure 7 is a similar view with the control means partially retracted.

Figure 8 is a similar view with the control means fully retracted and the transmission remaining in first speed.

Figure 9 is a similar view with the control means again partially advanced to shift the transmission into another speed or to neutral.

Figure 10 is a perspective detail view of a spring unit preferably forming part of the invention.

Figure 1:
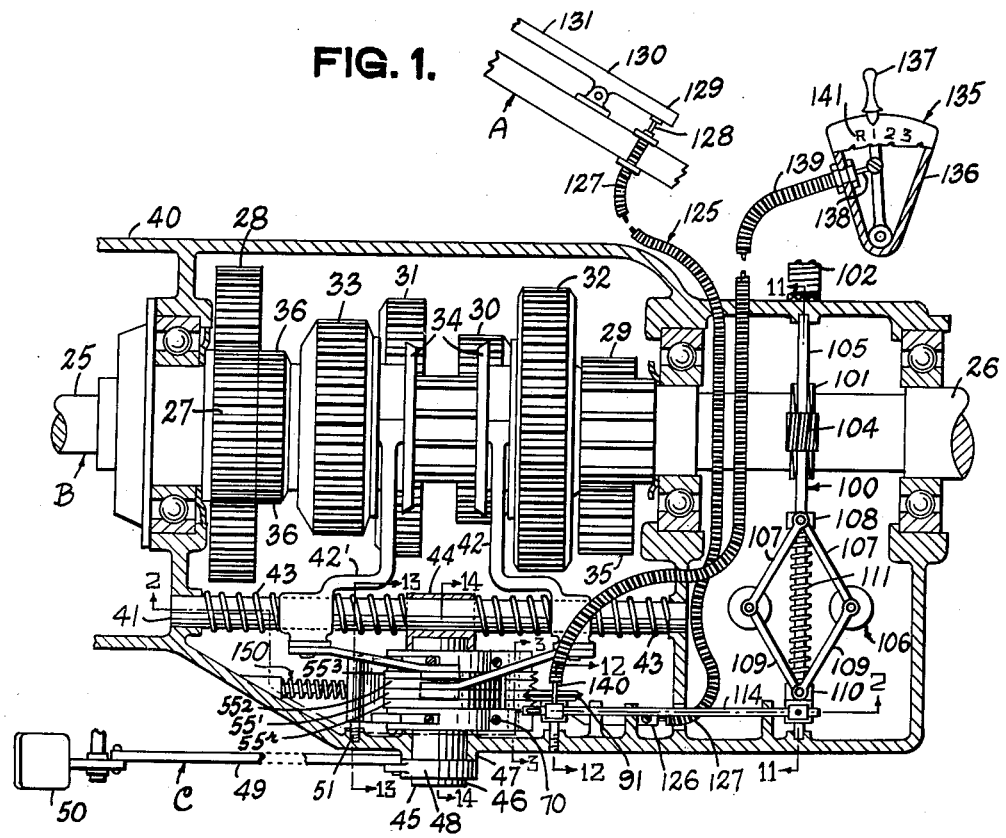
Figure 1 is a horizontal sectional view of a vehicle change speed transmission equipped with the semi-automatic control means.

In the drawings, which for the purpose of illustration show only a preferred embodiment of the invention, and wherein similar reference characters denote corresponding parts thruout the several views, the letter A designates a fragmentary portion of an automotive vehicle, including a change speed transmission B and control means C.

The transmission B preferably is of conventional construction and includes axially aligning drive and driven shafts 25—26. Fixed on the drive shaft 25 is a drive pinion 27 meshing with countershaft gear 28 to constantly rotate reverse gear 29, first speed gear 30, and second speed gear 31, all fixed on a countershaft (not shown). Splined for axial movement on the driven shaft 26 are sliding gears 32—33 including shifting collars 34. In Figure 1 of the drawings, these sliding gears 32—33 are shown in their neutral positions. The gear 32, by sliding to the left is brought into mesh with first speed gear 30, and by movement to the right, is connected for rotation with reverse gear 29, through the usual reverse idler 35. The gear 33, by sliding to the right, is brought into mesh with second speed gear 31, and by movement to the left, is directly connected for rotation with drive pinion 27, in any suitable manner. In the example shown, the drive pinion 27 includes an external gear portion 36 for clutching engagement internally of the gear 33.

Referring now to the control means C, there is provided in the transmission housing 40, a guide rod 41 parallel to the drive and driven shafts 25—26 and slidably supporting a pair of shifter forks 42, 42' co-acting with collars 34 in the usual manner to slidably shift gears 32—33 respectively, into and out of mesh. These gears 32—33 are urged into neutral positions, as by the equalizing or counterbalancing action of expansion coil springs 43 encircling guide rod 41 at opposite sides of the shifter forks 42, 42'.

Figure 15:
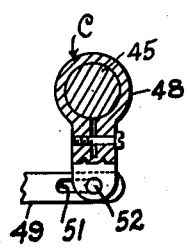
Figure 15 is a fragmentary detail view partly in side elevation and partly in vertical section, of an operating lever and link preferably forming a part of the invention.
Figure 14:
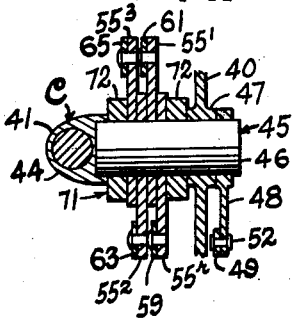
Figure 14 is a vertical cross-sectional view substantially on the line 14—14 of Figure 1.
Figure 16:
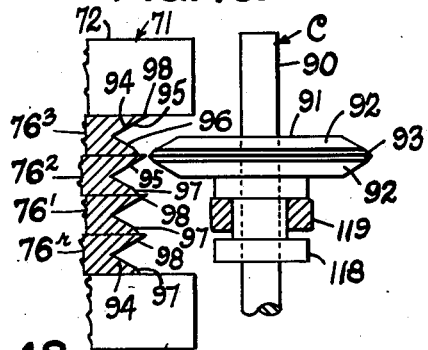
Figure 16 is a fragmentary detail view partly in top plan and partly in horizontal section, of a selector wheel and pawls preferably forming a part of the invention.

Mounted on the guide rod 41 intermediate the shifter forks 42, 42' is a bearing 44 supporting one end portion of a rock shaft 45, having its opposite end portion 46 extending outwardly of the transmission housing 40, thru a suitable bearing 47. Fixed on the rock shaft 45 is a crank lever 48 connected as by link 49 to a pedal 50 preferably constituting the clutch pedal of the automotive vehicle. As shown in Figure 15, this link 49 may be provided with a slot 51 forming with the crank lever pin 52 a lost motion connection to permit partial depression of the pedal 50 prior to rocking of the shaft 45.

Figure 2:
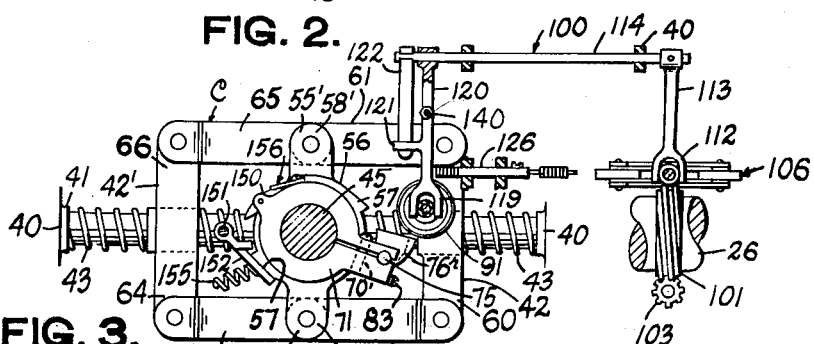
Figure 2 is a longitudinal vertical sectional view substantially on the line 2—2 of Figure 1.

Mounted for rotation on the rock shaft 45 is a plurality of change speed members 55$^r$, 55$^1$, 55$^2$, 55$^3$, each including an annular portion 56 encircling the rock shaft, a pair of diametrically opposite ratchet teeth 57 projecting from the annular portion and a lever portion extending radially outwardly from the annular portion 56. In the example shown, these lever portions are disposed in alternating downwardly and upwardly extending relation, the first or outermost lever portion 58$^r$ extending downwardly and being connected, as by link 59, to the lower end 60 of the fork 42, for shifting gear 32 into mesh with reverse idler 35. The second outermost lever portion 58' extends upwardly and is connected, as by link 61, to the upper end 62 of the same fork 42, for shifting gear 32 in the opposite direction and into mesh with first speed gear 30. The next or third lever portion 58$^2$ extends downwardly for connection by link 63 to the lower end 64 of the other fork 42', for shifting gear 33 to the right, as viewed in Figure 1, and into mesh with second speed gear 31. The fourth and innermost lever portion 58$^3$ extends upwardly and is connected, as by link 65 to the upper end 66 of the last mentioned fork 42', for shifting gear 33 to the left and into direct driving connection with the portion 36 of drive pinion 27. This arrangement of lever portions 58$^r$, 58$^1$, 58$^2$, 58$^3$ and links 59, 61, 63, 65 is such that upon movement of gears 32, 33 to their respective neutral positions, under the influence of neutralizing springs 43, the ratchet teeth 57 will be disposed in substantial alignment, as shown in Figures 2, 4 and 5.

Figure 3:
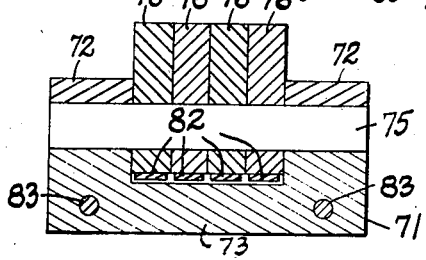
Figure 3 is a transverse vertical sectional detail view substantially on the line 3—3 of Figure 1.
Figure 12:
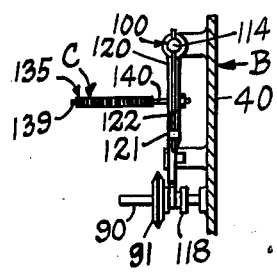
Figure 12 is a vertical cross-sectional view substantially on the line 12—12 of Figure 1.
Figure 11:
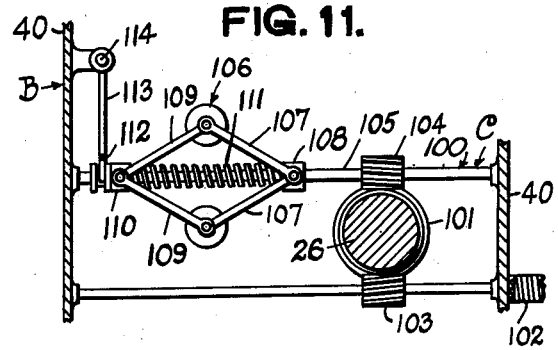
Figure 11 is a vertical cross-sectional view substantially on the line 11—11 of Figure 1.
Figure 13:
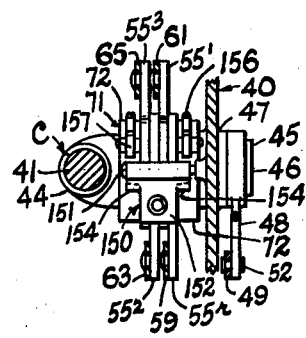
Figure 13 is a vertical cross-sectional view substantially on the line 13—13 of Figure 1.

Fixed for movement with the rock shaft 45, as by clamping screws 70, is a carriage 71, including carrier members 72 secured in spaced relation and at opposite sides of the change speed members, as by cross bar 73. Rigidly extending between the carrier members 72 in spaced relation above the cross bar 73 is a rod 75 rotatably supporting a plurality of pawls 76$^r$, 76$^1$, 76$^2$, 76$^3$ disposed in the planes of the change speed members 55$^r$, 55$^1$, 55$^2$, 55$^3$ respectively and each pawl movable into and out of engagement with its aligning change speed member. Any suitable spring means may be provided to urge the pawls out of engagement with the change speed members. In Figure 10 is shown a spring unit 80 including an elongate plate 81 and a plurality of resilient fingers 82 extending laterally from a side edge of the plate. Preferably, the elongate plate 81 is attached as by screws 83, to the carriage adjacent the cross bar 73 so that each of the resilient fingers 82 lies between the cross bar and a different pawl as shown in Figure 3 and with the upturned tips 84 of the fingers engaging shoulders 85 on the pawls, as shown in Figures 4–9, whereby to urge the pawls out of engagement with the change speed members.

Means is provided to selectively engage the pawls with the change speed members. Rigidly carried by the transmission housing 40 is a fixed axle 90 supporting a selector wheel 91 for rotation and axial sliding movement between positions adjacent the pawls 76. This selector wheel 91 includes beveled circumferential margins 92 at opposite sides of a chamfered peripheral edge 93. Referring to Figures 4–9 and 16, it will be noted that the pawls include longitudinally curved grooved portions 94 having divergent side walls 95, 96, terminating in edges 97, 98. These edges 97, 98 of adjacent pawls are arranged in pairs and it is preferred that one edge 97 of each pair be chamfered or otherwise suitably reduced so as to terminate inwardly of its companion edge 98. Upon counter-clockwise movement of the rock shaft 45, the carriage 71 swings all the pawls upwardly and the selector wheel 91, which is disposed in the path of travel of the pawls, serves as a cam to inwardly deflect one of the pawls into engagement with its associated change speed member, the position of the selector wheel lengthwise its axle 90 determining the particular pawl selected. By leveling the selector wheel 91 along its periphery, and providing the grooved portions 94 in the pawls, the selector wheel will be limited to engagement with a single pawl, even though the wheel is partially out of alignment therewith. Being mounted for movement lengthwise the axle, the selector wheel 91 will be automatically shifted into alignment with the selected pawl, upon engagement therewith, due to the guiding action of the grooved portion thereof. Arranging the adjacent edges 97, 98 one advance of the other will prevent any tendency of the selector wheel to become engaged between the meeting faces of adjacent pawls.

Figure 17:
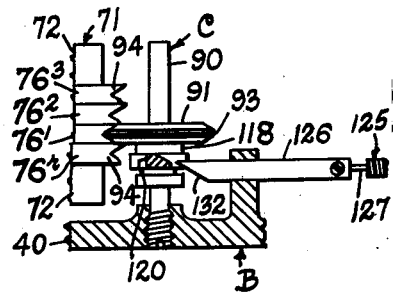
Figures 17 and 18 are fragmentary horizontal sectional detail views respectively showing the relative position of parts before and after shifting of the selector wheel from its forward speed position to its reverse speed position.

Means 100 is provided to automatically correlate the selector wheel 91 to the forward speed of the vehicle A. Fixed on the driven shaft 26, which constitutes the propeller shaft of the vehicle, is a gear 101, such as ordinarily employed to operate the speedometer cable 102 thru the usual power take-off gear 103. Meshing with the gear 101 is a suitable gear 104 fixed on a shaft 105 rotatably mounted in the housing 40. Any suitable speed influenced governor 106 may be mounted on the shaft 105. In the example shown, the governor comprises weighted arms 107 each pivoted at one end to a collar 108 fixed on shaft 105, and links 109 connecting the weighted arms 107 at their free ends to a sliding collar 110. Encircling the shaft 105 is an expansion coil spring 111 urging the sliding collar 110 away from the fixed collar. Rotation of the shaft 105 will tend to outwardly swing the weighted arms 107 and, thru links 109, draw the sliding collar 110 toward the fixed collar against the resistance of spring 111. Therefore, the position of the sliding collar 110 will depend on the rate of rotation of the shaft 105 as determined by the speed of the vehicle. Engaged with the sliding collar 110 is the forked end 112 of an arm 113 fixed on a shaft 114, rotatably supported by housing 40. Connected for movement with a collar 118, preferably integral with the selector wheel 91, is the forked end 119 of an arm 120 pivoted on shaft 114. Secured to the arm 120, at lug 121, is one end of a leaf spring 122, having its opposite end fixed in the shaft 114. The arm 120 being pivoted on the shaft 114, this spring 122 constitutes a resilient connection between the selector wheel 91 and the governor 106. It is preferred that the relationship of parts be such that the governor 106, when the vehicle is idle, will position the selector wheel in substantial alignment with the next to the outermost pawl 76¹, as shown in Figures 1 and 17. The relationship of parts may be such that, upon forward travel of the vehicle at speeds from approximately five to fifteen miles per hour, the governor 106 will dispose the selector wheel in substantial alignment with the next to the innermost pawl 76², and at speeds over fifteen miles per hour, in substantial alignment with the innermost pawl 76³.

Figure 18:
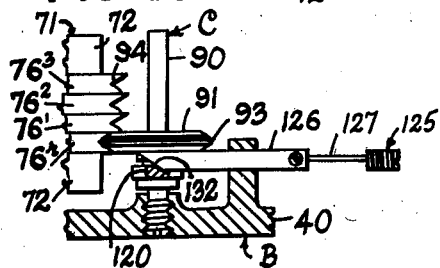

Means 125 is provided for moving the selector wheel 91 from its position of substantial alignment with the pawl 76¹ into a position of substantial alignment with the outermost pawl 76ʳ. This means 125 comprises a bolt 126 slidably carried by the housing 40, and a suitable connection, such as a Bowden cable 127, terminating in a button 128, for actuation by an occupant of the vehicle A. In the example illustrated in Figure 1, this button 128 is disposed beneath the heel end 129 of a pivoted accelerator pedal 130, depressible at its forward end 131 for accelerating the vehicle engine. When the vehicle is motionless, the governor 106 disposes the forked selector arm 120 as shown in Figure 17, in the path of travel of the bolt 126. This bolt 126 is provided with a beveled forward end 132 which, upon projection of the bolt, laterally throws the arm 120 to a position, as shown in Figure 18, wherein the selector wheel 91 is brought into alignment with the outermost pawl 76ʳ. It will therefore be seen that projection of the bolt, thru depression of the heel end 129 of accelerator pedal 130, will shift the selector wheel into co-acting relationship to the outer pawl 76ʳ, except during forward travel of the vehicle, at which time the forked selector arm 120 is laterally shifted to a position out of the path of travel of the bolt 126. It will also be noted that the forked arm 120 may be pedally shifted by means 125 without necessarily affecting the governor 106, due to the provision of the spring 122 for connecting the governor and arm 120.

Manual control means 135 for disposing the selector wheel in alignment with any one of the pawls may also be provided. Pivotally secured to a suitable bracket 136 is a hand lever 137 operatively connected to one end 138 of a Bowden cable 139, the opposite end 140 of which is connected to the forked selector arm 120. The bracket 136 preferably is provided with suitable indicia 141 to indicate the locations in which to place the hand lever 137 for correct alignment of the selector wheel with the several pawls.

In order to releasably maintain the transmission B with a selected one of the sliding gears 32—33 in mesh, locking means 150 is provided. Fixedly secured to housing 40 is an inwardly projecting pin 151 pivotally supporting a locking plate 152, having a free end 153 of a width substantially equal to the combined width of the change speed members 55ʳ, 55¹, 55², 55³, and swingable into and out of a position wherein to dog the teeth 57 thereof. At opposite sides the locking plate 152 is provided with integral lugs 154 which extend laterally from the locking plate and terminate adjacent the opposite side members 72 of carriage 71. Any suitable means, such as spring 155, may be provided to urge the free end 153 of locking plate 152 into its dogging position. Means 156 is provided for moving the free end 153 out of dogging relation to the teeth 57. Pivotally secured one to each side member 72 of the carriage 71 are release cams 157 including toe portions 158 and heel portions 159, acted on by suitable leaf springs 160, for urging the toe portions 158 outwardly of the respective side members 72. The arrangement is such that swinging of the free end 153 of the locking plate into its dogging position will dispose the lugs 154 thereof in the path of travel of the normally projected toe portions 158 of the release cams 157.

The semi-automatic operation of the transmission control C, assuming the vehicle to be motionless and the selector wheel 91 in substantial alignment with the next to the outermost pawl 76¹, as shown in Figures 1, 2 and 4, will now be described. With the sliding gears 32 and 33 in their neutral positions and the engine of the automotive vehicle A running to turn the drive shaft 25, the clutch pedal 50 is depressed to release the drive shaft from the engine in the usual manner. During the first part of the downward travel of clutch pedal 50, the slack between link 49 and lever 48, as shown at 51 in Figure 15, is taken up and the clutch is disengaged. Further downward travel of the clutch pedal will rock the shaft 45 and thereby rotate the carriage 71 in a counterclockwise direction, from the position shown in Figure 4 to that of Figure 5. As the carriage rotates, the second outermost pawl 76¹ comes into contact with the aligning selector wheel 91 and is cammed into engagement with its associated change speed member 55¹. This provides a mechanical connection between the clutch pedal 50 and sliding gear 32, via link 49, lever 48, rock shaft 45, carriage 71, pawl 76¹, change speed member 56¹ and, thru link 61, to the upper end 62 of the shifting fork 42 of gear 32. At this time, the toes 158 of release cams 157 are about to ride past lugs 154 of locking plate 152, after having swung the free end 153 thereof out of dogging relation to the teeth 57 of the several change speed members. A still further downward depression of the clutch pedal will swing the carriage 71 from the position shown in Figure 5 to that shown in Figure 6, whereby to pull link 61 to a position wherein the shifter fork 42, at the right in Figure 6, is drawn toward the other shifter fork 42' and thereby moves the sliding gear 32 into mesh with the first speed gear 30. Incidentally, the link 59 is moved by the shifter fork 42 to the position shown in Figure 6, thereby rotating the change speed member 55$^r$ in a clockwise direction, but this movement does not affect the change speed transmission. It will also be noted that the locking plate 152, under the influence of spring 155, snaps into dogging relation to the tooth 57 of change speed member 55$^1$ so as to hold the gears 32 and 30 in mesh for first speed.

Upon partial release of the clutch pedal, the carriage 71 will swing from the position shown in Figure 6 to that in Figure 7. As the carriage 71 returns, the toe portions 158 of cams 157 are deflected by the lugs 154 without influencing the locking plate 152. Allowing the clutch pedal 50 to complete its return will, during the last part of its travel throw in the clutch and connect the vehicle engine to the drive shaft 25 in the usual manner for propelling the vehicle in first gear, the carriage and its associated parts assuming the position illustrated in Figure 8.

Acceleration of the vehicle will, thru the action of the governor 106, shift the selector wheel into co-acting relation with a different pawl. At approximately ten miles per hour, the selector wheel 91 preferably is in substantial alignment with the pawl 76$^2$. If the clutch pedal is again partially depressed, the carriage and its associated parts will be shifted from the position shown in Figure 8 to that of Figure 9. As the carriage swings in a counter-clockwise direction, the toe portions 158 of the release cams 157 strike the lugs 154 of locking plate 152 and throw the free end 153 thereof out of ratcheting engagement with the tooth 57 of first speed change member 55'. Figure 9 shows the free end 153 of the locking plate as disengagement with the said tooth 57 occurs, to permit return of the shifting fork 42 and gear 32 to their neutral positions under the influence of neutralizing springs 43. Release of the clutch pedal at this time will therefore return the carriage and its associated parts to its original position as illustrated in Figure 4, wherein the transmission is in its neutral position. If, however, the clutch pedal instead of being released, is further depressed, with the selector wheel 91 aligning with pawl 76$^2$, link 63 will be drawn over to a position wherein the other shifting fork 42' will dispose the sliding gear 33 in mesh with second speed gear 31. The same movements are performed for neutralizing second and meshing third speed gears, upon respective partial and full depression of the clutch pedal at a vehicle speed sufficient to bring the selector wheel 91 into co-action with the pawl 76$^3$.

In pedal operation of the control means C to dispose the transmission B in reverse gear, the vehicle is first brought to a stop, if traveling forwardly, and then the heel portion 129 of accelerator pedal 130 is depressed, whereby to shift selector wheel 91 into substantial alignment with pawl 76$^r$. Thereupon, a full depression and release of the clutch pedal 50 will place the transmission in reverse. It will be seen that it is mechanically impossible to mesh the reverse gears by means 125 including accelerator pedal 130, while the vehicle is in forward motion.

It will also be seen that it is mechanically impossible to shift, by means 100 including the governor 106, into a forward speed in disaccord with the forward rate of travel of the vehicle. Complete control of the vehicle is had at all times, for instance, the car may be accelerated in low gear until a relatively high rate of speed is attained, and the transmission may then be shifted directly into third speed.

The manually operated means 135 may of course be employed to set the selector wheel 91 in a position other than that normally dictated by the governor 106. When the governor is relied on for control, the position of the selector wheel 91 will be constantly indicated by the relationship of the hand lever 137 to the indicia 141.

It will of course be understood that either the governor controlled means 100 or the manually controlled means 135 may be employed separately of the other, if desired.

Various changes may be made in the form of the invention herein shown and described, without departing from the spirit of the invention or the scope of the following claims.

We claim:

1. In control means for a change speed transmission, a plurality of change speed members movable to provide different driving connections in said transmission, means for operating said change speed members including a plurality of pawls having grooved portions normally in side by side relation, a selector movable laterally of said pawls and including a wedge portion for engagement with said grooved portions, and resilient means for laterally moving said selector.

2. The combination with an automotive vehicle having a clutch pedal and a change speed transmission providing a reverse connection and a plurality of forward speed connections including a low speed connection, of a reverse member for effecting said reverse connection and a plurality of forward speed members for effecting said forward speed connections and including a low speed member for effecting said low speed connection, a movable selector having forward speed positions for connecting said clutch pedal to said forward speed members, said selector being movable into a given forward speed position for connecting said clutch pedal to said low speed member, and into a reverse position for connecting said clutch pedal to said reverse member, speed controlled resilient means for urging said selector into said forward speed positions upon forward movement of the vehicle and into said given position upon stopping of the vehicle, and means co-acting with said selector only upon substantial disposition of said selector in said given position for moving said selector into said reverse position.

3. The combination with an automotive vehicle having a clutch pedal and a change speed transmission providing a reverse connection and a plurality of forward speed connections including a low speed connection, of a reverse member for effecting said reverse connection and a plurality of forward speed members for effecting said forward speed connections and including a low speed member for effecting said low speed connection, a movable selector having forward speed positions for connecting said clutch pedal to said forward speed members, said selector being movable into a given forward speed position for connecting said clutch pedal to said low speed member, and into a reverse position for connecting said clutch pedal to said reverse member, manually controllable means for moving said selector and constituting a selector position indicator, speed controlled resilient means for urging said selector into said forward speed positions upon forward movement of the vehicle and into said given position upon stopping of the vehicle, and means co-acting with said selector only upon substantial disposition of said selector in said given position for moving said selector into said reverse position.

4. In a change speed transmission including a shaft and a pair of collars on said shaft and movable from neutral positions to provide different driving connections in said transmission, an elongate guide paralleling said shaft, a pair of spaced members movable longitudinally of the guide and carrying shifting forks for moving said collars, a bearing carried by the guide intermediate said spaced members, spring means carried by the guide at opposite sides of said spaced members for urging said shifting forks into neutral positions, a rock shaft carried by said bearing, means for oscillating the rock shaft, a plurality of change speed members mounted for rotation on the shaft, and operatively connected to said fork-carrying members to move said collars, devices for connecting said change speed members for movement with said rock shaft, a selector operative to individually engage said devices, and means for operating the selector.

5. In a change speed transmission including a pair of collars movable from neutral positions to provide different driving connections in said transmission, an elongate guide, a pair of spaced members movable longitudinally of the guide and carrying shifting forks for moving said collars, spring means for urging said shifting forks into neutral positions, a rock shaft, means for rocking the shaft, a plurality of change speed members mounted for rotation on the shaft, and operatively connected to said fork-carrying members to move said collars, a carriage mounted for movement with said rock shaft, pawls movable with said carriage to advance said change speed members, dog means to prevent retraction of said change speed members, means carried by said carriage for releasing said dog means upon movement of the carriage to advance said change speed members, means normally urging said pawls out of co-action with said change speed members, a selector operative to effect individual co-action of said pawls with said change speed members, and means for operating the selector.

6. In control means for a change speed transmission, a plurality of change speed members movable to provide different driving connections in said transmission, means for operating said change speed members including a plurality of pawls having grooved portions normally in side by side relation, an axle, a selector wheel mounted for axial and rotatory movement on said axle, and including a beveled periphery for engagement with said grooved portions, and means for axially moving said selector wheel.

7. In control means for a change speed transmission, a plurality of change speed members movable to provide different driving connections in said transmission, means for operating said change speed members including a plurality of pawls having grooved portions normally in side by side relation, a selector movable laterally of said pawls and including a beveled portion for engagement with said grooved portions, and means for laterally moving said selector.

8. In control means for a change speed transmission, a plurality of change speed members movable to provide different driving connections in said transmission, means for operating said change speed members including a plurality of adjacent pawls having grooved portions normally in side by side relation, said grooved portions including divergent side walls terminating in edges, the edges of adjacent pawls forming pairs, one edge of each pair being chamfered, a selector movable laterally of said pawls and including a beveled portion having convergent side walls terminating in an edge, said beveled portion for engagement with said grooved portions, and means for laterally moving said selector.

PERRY E. CASSELL.
ROBERT R. MEEKER.